(No Model)
J. K. BURGESS.
TOOTH CROWN HOLDER.
No. 585,305. Patented June 29, 1897.
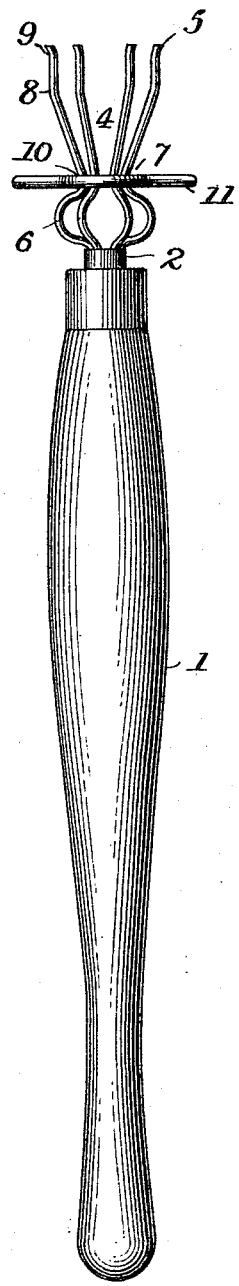
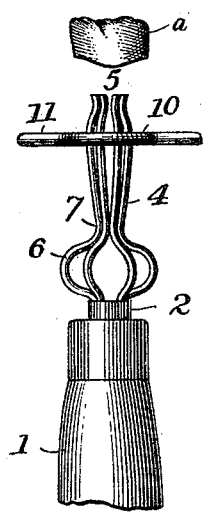
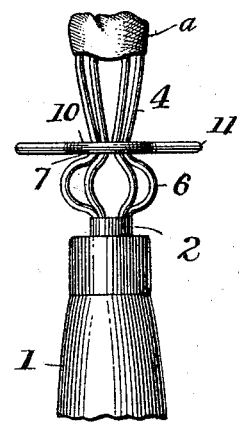
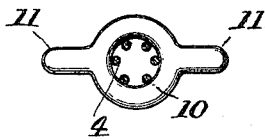
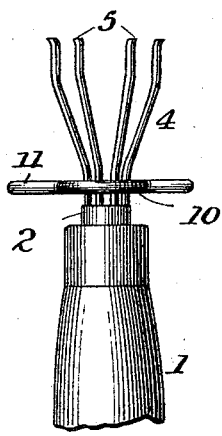
Witnesses
J. G. Hinkel.
William E. Neff.
Inventor
James K. Burgess
by Watson & Watson
Attorneys

UNITED STATES PATENT OFFICE.

JAMES KENDALL BURGESS, OF BALTIMORE, MARYLAND.

TOOTH-CROWN HOLDER.

SPECIFICATION forming part of Letters Patent No. 585,305, dated June 29, 1897.

Application filed October 30, 1896. Serial No. 610,599. (No model.)

*To all whom it may concern:*

Be it known that I, JAMES KENDALL BURGESS, a citizen of the United States, residing at Baltimore, in the State of Maryland, have invented certain new and useful Improvements in Tooth-Crown Holders, of which the following is a specification.

My invention relates to an improvement in tools for holding tooth-crowns and like articles while the same are being ground or polished.

The invention comprises a suitable handle, a group of spring-arms which normally flare outwardly from the end of the handle in a circle, and a sliding collar which surrounds the spring-arms and is adapted to draw the outer ends of the arms together when it is moved outward and to allow them to spring apart when the collar is moved inward, so that a tooth-crown placed over the ends of the arms when they are drawn together will be gripped by the sharpened ends or retaining-points of the arms when the latter are allowed to expand.

The invention also consists in details of construction, which will be described in the following specification.

In the accompanying drawings, which form part of my specification, Figure 1 is a side view of the holder with the spring-arms in their normal expanded position. Fig 2 is a similar view with the collar moved outward and the spring-arms contracted, so as to permit a tooth-crown to be placed over the ends of the arms. Fig. 3 is a similar view with the tooth-crown upon the holder and the sliding collar withdrawn. Fig. 4 is a plan view of the sliding collar. Fig. 5 is a side view of a holder of modified form.

Referring to the drawings, 1 indicates a handle of ordinary construction, into which is fitted a shank 2, to which is attached a number of spring-arms 4. These arms preferably consist of short spring-wires, which in their general direction flare outwardly from the shank 2, so that the ends 5 of the arms are arranged in a circle. The wires may be curved in any desired form to give them required elasticity. In the preferred form (illustrated in Figs. 1 to 3, inclusive) I have shown the wires having the lower part 6 curved outwardly from the shank 2 and then inward toward a common center at 7. From the point 7 the arms are each inclined outwardly to a point 8 near their ends, and thence inwardly to a point 9, where they are again bent slightly outward, and terminate in sharp holding-points 5. The collar 10 consists of a ring provided with extensions or handles 11 at opposite sides. This collar surrounds the spring-arms 4 and is adapted to fit loosely upon the contracted part 7 of the holder when not in use.

When it is desired to place a tooth-crown upon the holder, the collar is forced outward by means of the extensions 11, and the ends of the arms are thereby drawn together, as shown in Fig. 2. The tooth-crown $a$ is now placed over the ends of the spring-arms and the collar withdrawn, when the holding-points 5 will spring outward and engage the inner walls of the crown and hold it securely. To remove the crown, the operation is reversed.

I may dispense with the bends 6 and construct the arms as shown in Fig. 5, but the curved arms are more elastic. I may also secure the arms to the handle in any suitable way, and the shape of the arms may be varied without departing from the spirit and scope of my invention.

It will be seen that the holding-points, being on independent arms, will adjust themselves to irregular as well as regular openings, and that the tool is therefore peculiarly adapted for holding tooth-crowns. It is useful, however, for holding rings and other small articles in the manufacture of jewelry, and for other purposes, and I desire protection for it as applied to all of such uses and purposes.

What I claim, and desire to secure by Letters Patent, is—

1. A tooth-crown holder comprising a handle, a circular group of independent spring-arms attached to said handle and flaring outwardly, the ends of said arms having outwardly-projecting holding-points, and a sliding collar surrounding said arms, as and for the purpose set forth.

2. A tooth-crown holder comprising a handle, a circular group of independent spring-arms attached to said handle and flaring outwardly, the ends of said arms having outwardly-projecting holding-points, a sliding collar surrounding said arms, and extensions or handles 11 upon said collar, as and for the purposes set forth.

In testimony whereof I affix my signature in presence of two witnesses.

JAMES KENDALL BURGESS.

Witnesses:
J. HENRY STROHMEYER,
JNO. WATSON, Jr.